Sept. 29, 1959  L. R. VAN BLERKOM  2,906,951
POTENTIOMETRIC MEASURING NETWORK
Filed April 11, 1955
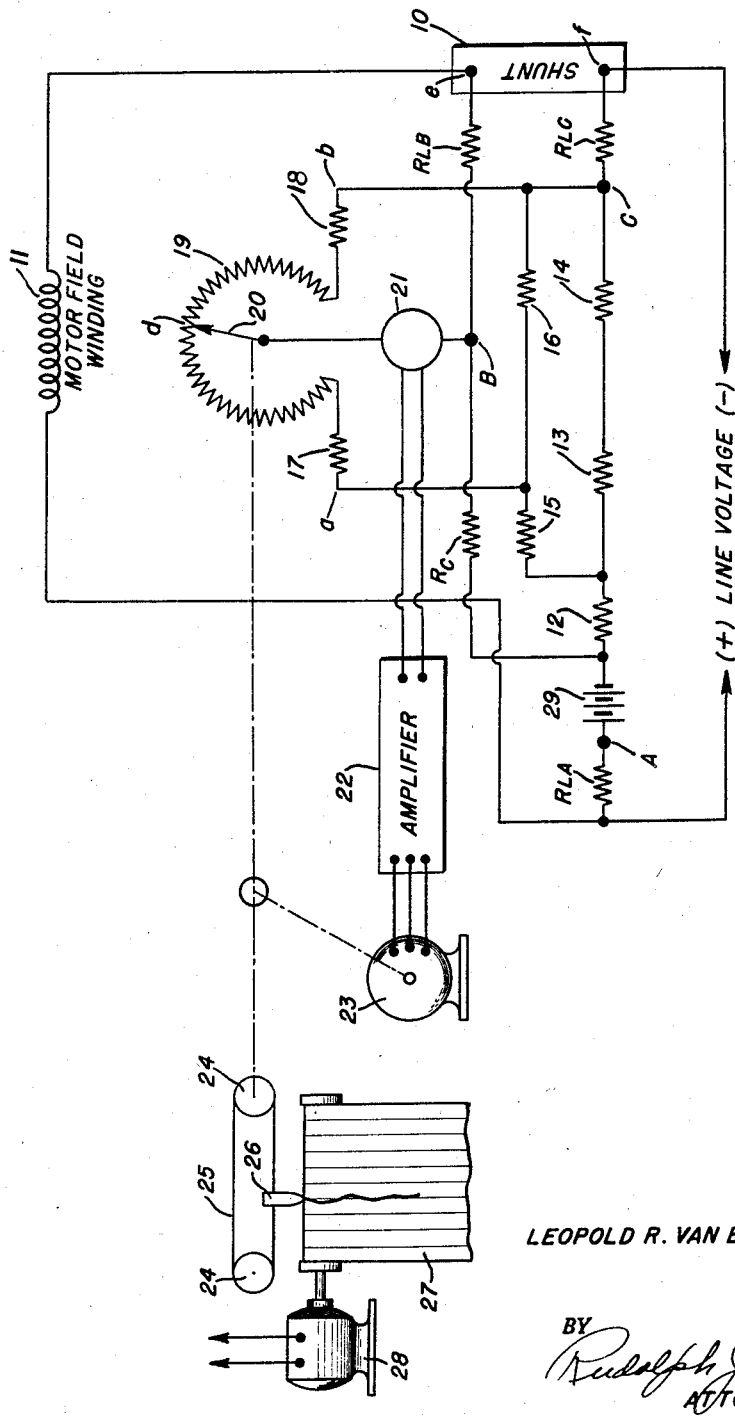
LEOPOLD R. VAN BLERKOM
INVENTOR.
BY
Rudolph J. Lucick
ATTORNEY

United States Patent Office 2,906,951
Patented Sept. 29, 1959

2,906,951

POTENTIOMETRIC MEASURING NETWORK

Leopold R. Van Blerkom, Westfield, N.J., assignor, by mesne assignments, to Daystrom, Incorporated, Murray Hill, N.J., a corporation of New Jersey Application April 11, 1955, Serial No. 500,550

2 Claims. (Cl. 324—63)

This invention relates to a measuring system of the potentiometric balance type and more particularly to a potentiometer measuring network adapted for the measurement of the resistance of an element while an electric current flows therethrough.

It is often desirable to provide a continuous indication of the temperature of a motor field winding while the motor is in operation. In the case of a direct current motor, it is known that the resistance of the field winding can be obtained by measuring the voltage drop across the winding and the current flowing therethrough. Thus, knowing the resistance of the field winding at one temperature the corresponding temperatures for all resistance values of the winding can be calculated. A potentiometric balance type of network generally is used to determine the ohmic resistance of the winding and a suitable mechanism that is sensitive to network unbalance can be used to maintain the network in balance and to operate a recorder having a scale calibrated in temperature values.

In systems of this type there are two voltages applied to the measuring network, one voltage being related to the line voltage applied to the motor winding, and the other voltage being related to the current flowing through the winding. The latter voltage is obtained by a shunt inserted in the motor field winding lead. Inasmuch as the measuring network and/or recorder are generally located at a point spaced from the motor and it is desirable that the instrument be movable from one location to another, errors arise in the measuring network. These errors arise by reason of the voltage drop in the lead between the point where the potential circuit is connected to motor winding and the location of the shunt from which leads extend to the measuring network and to the varying voltage drop in the shunt leads due to different magnitudes of current flowing therethrough. Consequently, it has heretofore been necessary to calibrate the measuring network at the factory for a specific lead resistance but this is not entirely satisfactory since recalibration is necessary when the instrument is moved to a new location. Also, if the network is calibrated on the basis of zero lead resistance, the balance point on the slide wire, for a given resistance of the motor winding, will shift away from the original balance point to an extent depending upon the actual resistance of the leads used.

An object of this invention is the provision of a potentiometric balance network that is not subject to the errors pointed out above.

An object of this invention is the provision of a self-balancing recorder for continuously recording the temperature of an element carrying a D.-C. current, said recorder including a novel potentiometer balance network which is not adversely affected by a change in the resistance of the leads connecting the network to the element.

An object of this invention is the provision of apparatus for recording the temperature of a motor winding by the resistance method and comprising a shunt inserted in a lead of the motor winding, a slide wire potentiometer, circuit elements for impressing across the ends of the potentiometer a portion of the voltage drop developed across the motor winding, circuit elements for impressing the voltage drop of the shunt between one end of the potentiometer and the slider, said voltages applied to the potentiometer being equal and opposite when the slider is in a predetermined position, a compensating resistor connected between the slider and the other end of the potentiometer, sensing means responsive to unbalance of the voltages applied to the potentiometer, control means actuated by the sensing means to move the slider and re-establish voltage balance, a pen movable over a chart calibrated in temperature values and means actuated by the control means to move the pen in one direction or the other in correspondence with the magnitude and sense of voltage unbalance in the potentiometer.

These and other objects and advantages will become apparent from the following description when taken with the accompanying drawing showing a circuit diagram of the measuring network and a schematic representation of the associated components making up a recorder.

As shown in the drawing a shunt 10 is connected in one lead of the motor field winding 11, said winding being energized by a D.-C. voltage. The shunt is designed to produce a given millivolt drop when the current flow therethrough is some definite value related to the normal current flowing through the motor winding. The measuring network has three terminals A, B and C and is connected into the motor circuit by three leads, here identified as $R_{LA}$, $R_{LB}$ and $R_{LC}$, since such leads have finite ohmic resistance values. A voltage attenuator network comprising the resistors 12, 13, 14, 15 and 16 is connected across the line voltage leads and is designed to provide a predetermined fraction of the line voltage across the points $a$ and $b$ of the potentiometer comprising the fixed resistors 17, 18 and the slide wire 19. The values of the various resistors are so chosen that the voltage across the points $f$ and $d$ is equal to the voltage drop developed by the shunt (that is, points $f$ and $e$) when the slider 20 contacts the wire 19 at a predetermined point. More specifically, if the shunt produces a potential of 50 millivolts at normal current flow through the motor winding, an exact voltage balance obtains across the network points $d$ and B.

An unbalance-sensing device 21 is connected between the slider and the common network terminal B. As is well known in this automatic potentiometer balancing art, the sensing device can be a contact galvanometer or a vibrator. Such device responds, in direction and magnitude, to the voltage unbalance between the slider and the ends of the associated slide wire and controls the energization of an amplifier 22 in a corresponding sense and magnitude. A reversible motor 23 is mechanically coupled to the potentiometer slider 20 and rotation of the motor is controlled by the amplifier so as to maintain the slider at the point of exact balance. That is, a change in the current flowing through the motor field winding (brought about by an increase in winding resistance) will result in a momentary unbalance of the potentiometer and such unbalance will be sensed by the sensing device 21 to effectuate a rotation of the slider in a direction and to an extent necessary to re-establish a voltage balance across the points $d$ and B. The new position of the slider will correspond to the resistance change in the motor winding. The reversible motor 23 is also mechanically coupled to an arrangement of pulleys 24 and cable 25 whereby rotation of the motor imparts a corresponding linear movement to the pen 26, said pen being arranged to record a line on the chart 27 that is calibrated in temperature values and movable at a predetermined, constant speed as by the motor 28.

Once having established the resistance of the motor field winding 11 at a specific reference temperature, and knowing the magnitude of the line voltage, it is apparent that the components of the measuring network and the shunt can be given constants such that the potentiometer slider will occupy a selected position along the slide wire when the temperature of the winding 11 is at normal operating value such as, for example, 75° C. I prefer to set the slider at the central position under such conditions and to correspondingly set the recorder pen at the center of the chart. Any change in the resistance of the winding under measurement will result in a new balance position of the potentiometer slider and a corresponding new position of the recorder pen so that with the recorder chart properly calibrated there is provided a continuous record of the winding temperature during operation of the motor.

It may here be pointed out that there is a voltage drop across the brushes of the motor the temperature of which is to be measured. This voltage drop is constant and is compensated for, in the network, by a small battery 29 of equivalent voltage. Thus, the network is responsive to the actual voltage drop across the motor field winding.

Inasmuch as this system utilizes the potentiometric method of balancing, at balance no current flows through the sensing element, or detector, 21 and, consequently, there is no voltage drop in the lead $R_{LB}$. This does not hold, however, for the lead $R_{LC}$ as current will always flow through such lead as a result of the line voltage. Thus, if the measuring network is calibrated on the basis of zero lead resistance the balance point on the slide wire for a given resistance of motor field winding 11 will shift toward one end of the slide wire thereby resulting in an error in measurement and an erroneous record on the chart. If, on the other hand, the network is calibrated with a specific resistance assigned to the shunt leads $R_{LB}$ and $R_{LC}$ this would restrict the positioning of the recorder to a maximum distance corresponding to leads having such specific resistance. Any increase in lead length (and resistance) will also result in errors in the measurement.

I overcome these objectionable features of the system by inserting a compensating resistor $R_C$ between the terminal B and the battery 29. The value of the compensating resistor is equal to the effective resistance of the parallel-connected resistors 13, 14 and 15, 16 and the series resistor 12 so that the same quantity of current will flow through the lead $R_{LB}$ as through lead $R_{LC}$, assuming such leads are of equal resistance. This is readily accomplished in the field by using two wires of the same material, gauge and length. Any length shunt leads will not disturb the original calibration of the network, provided the two leads are of equal resistance since the voltage drop across $e$ and B will always be equal to that across the points of $f$ and C.

A simple method of checking the equality of the resistance of leads $R_{LB}$ and $R_{LC}$ is to connect both leads to one point on the shunt as, for example, the point $f$, and determine if there is any potential difference between the points C and B by means of a sensitive potentiometer. If no potential exists across these points the lead resistances are identical and if such potential does exist the length of one or the other of the leads can be changed until the potential is zero.

Having now described my invention in detail in accordance with the requirements of the patent statutes what I desire to protect by Letters Patent of the United States is set forth in the following claims.

I claim:

1. A self-balancing potentiometer system responsive to resistance changes of an element energized by a source of voltage, said system comprising a shunt connected in series with said element; first and second input terminals connectable to the said source of voltage; a common terminal; a slider in slidable engagement with a fixed resistance winding; a voltage-attenuator network connected across the first and second input terminals; a first resistor connected between one end of the said resistance winding and a predetermined point on the voltage-attenuator network; a second resistor connected between the other end of the said resistance winding and the second input terminal; voltage-responsive means connected between the slider and the common terminal; a pair of leads of equal ohmic resistance connecting the voltage terminals of the shunt to the second input and common terminals; a third lead connecting the first input terminal to said element on the side opposite the shunt; a compensating resistor connected between the first input terminal and the common terminal, said compensating resistor having an ohmic resistance equal to that of the voltage-attenuator network taken between the first and second input terminals; and means actuated by said voltage-responsive means to move the said slider in one or the other direction along the resistance winding to maintain a zero voltage across said actuating means.

2. The invention as recited in claim 1, wherein the said element is an electro magnetic device having brushes, and wherein the said compensating resistor and voltage attenuator network are connected to the first input terminal through a source of voltage having a magnitude substantially equal to the voltage drop across the said brushes.

References Cited in the file of this patent

UNITED STATES PATENTS

| | | |
|---|---|---|
| 1,665,397 | Wunsch | Apr. 10, 1928 |
| 1,931,223 | Harrison | Oct. 17, 1933 |
| 2,096,047 | Leeds | Oct. 19, 1937 |
| 2,230,779 | Johnson | Feb. 4, 1941 |
| 2,245,124 | Bonn | June 10, 1941 |
| 2,632,037 | Brancato et al. | Mar. 17, 1953 |